(12) United States Patent
Overdevest et al.

(10) Patent No.: US 6,729,059 B1
(45) Date of Patent: May 4, 2004

(54) APPARATUS FOR IDENTIFYING PLANTS

(75) Inventors: Edward J. Overdevest, Upper Deerfield Township, NJ (US); Gail A. Overdevest, Upper Deerfield Township, NJ (US); David Wilson, Harrisburg, PA (US)

(73) Assignee: Overdevest Nurseries, L.P., Bridgeton, NJ (US)

( * ) Notice: Subject to any disclaimer, the term of this patent is extended or adjusted under 35 U.S.C. 154(b) by 0 days.

(21) Appl. No.: 10/192,485

(22) Filed: Jul. 10, 2002

(51) Int. Cl.⁷ .................................................. G09F 3/12
(52) U.S. Cl. ............................................. 40/645; 47/66.6
(58) Field of Search ............................... 40/645, 642.02, 40/657, 648, 651, 653, 658; 47/66.6

(56) References Cited

U.S. PATENT DOCUMENTS

| | | | |
|---|---|---|---|
| 1,808,292 A | * | 6/1931 | Coppersmith ................. 40/645 |
| 3,138,886 A | * | 6/1964 | Cobb ........................... 40/604 |
| 4,027,410 A | | 6/1977 | Wheeler |
| 5,044,200 A | | 9/1991 | Dailey et al. |
| 5,537,768 A | | 7/1996 | Tesselaar et al. |
| 6,131,323 A | | 10/2000 | Wong et al. |
| 6,199,319 B1 | | 3/2001 | Skinner |

FOREIGN PATENT DOCUMENTS

EP        0560461 A1 * 9/1993 ............. G09F/3/18

* cited by examiner

Primary Examiner—Peter M. Poon
Assistant Examiner—Jeffrey L. Gellner
(74) Attorney, Agent, or Firm—Norman E. Lehrer

(57) ABSTRACT

The apparatus includes a stake, a hang tag, and a marker. The stake is an elongated member with a first end and a second end. The first end includes a bent portion and has a forked end with parallel top and bottom prong members. The hang tag and marker are removably secured to each other and to the prong members. The hang tag may be made from plastic and provides information regarding a particular type of plant. The marker also identifies the plant and is made from a weather resistant material. The marker may be generally oval-shaped with an elongated member extending downwardly from the bottom thereof. The stake with the hang tag and marker secured thereto may be placed in a potted plant. Additionally, the hang tag and marker may be removed from the stake and the marker placed directly into the ground or pot.

6 Claims, 2 Drawing Sheets

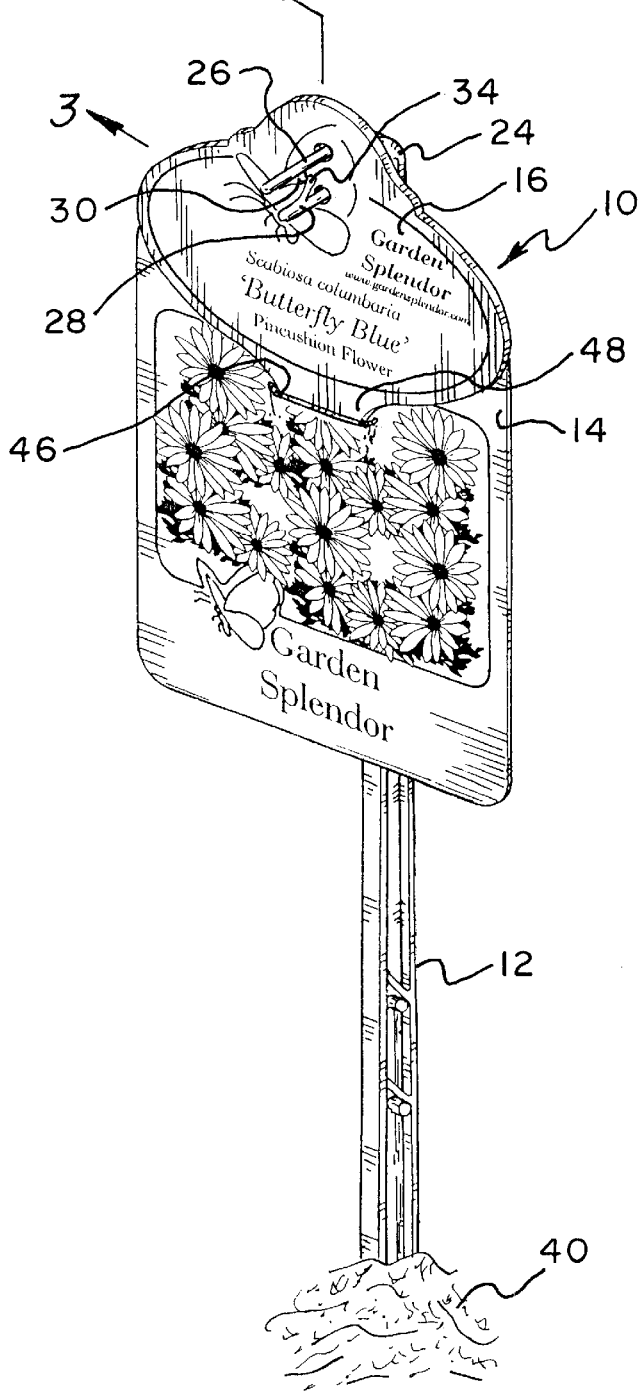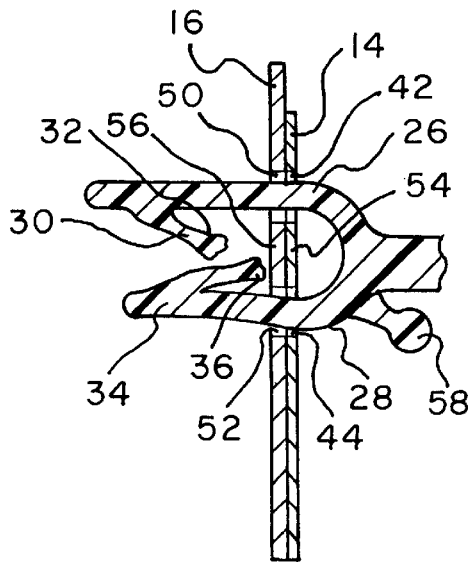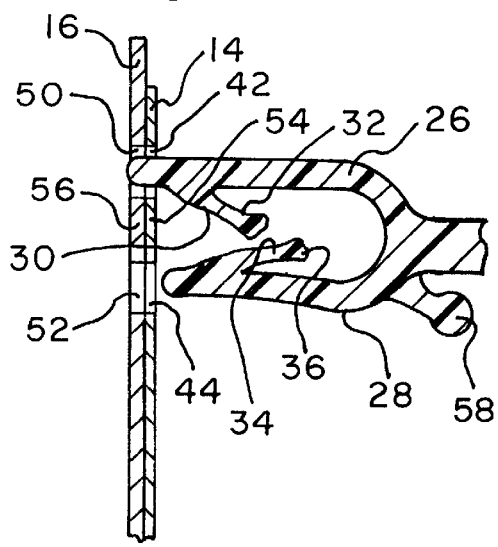

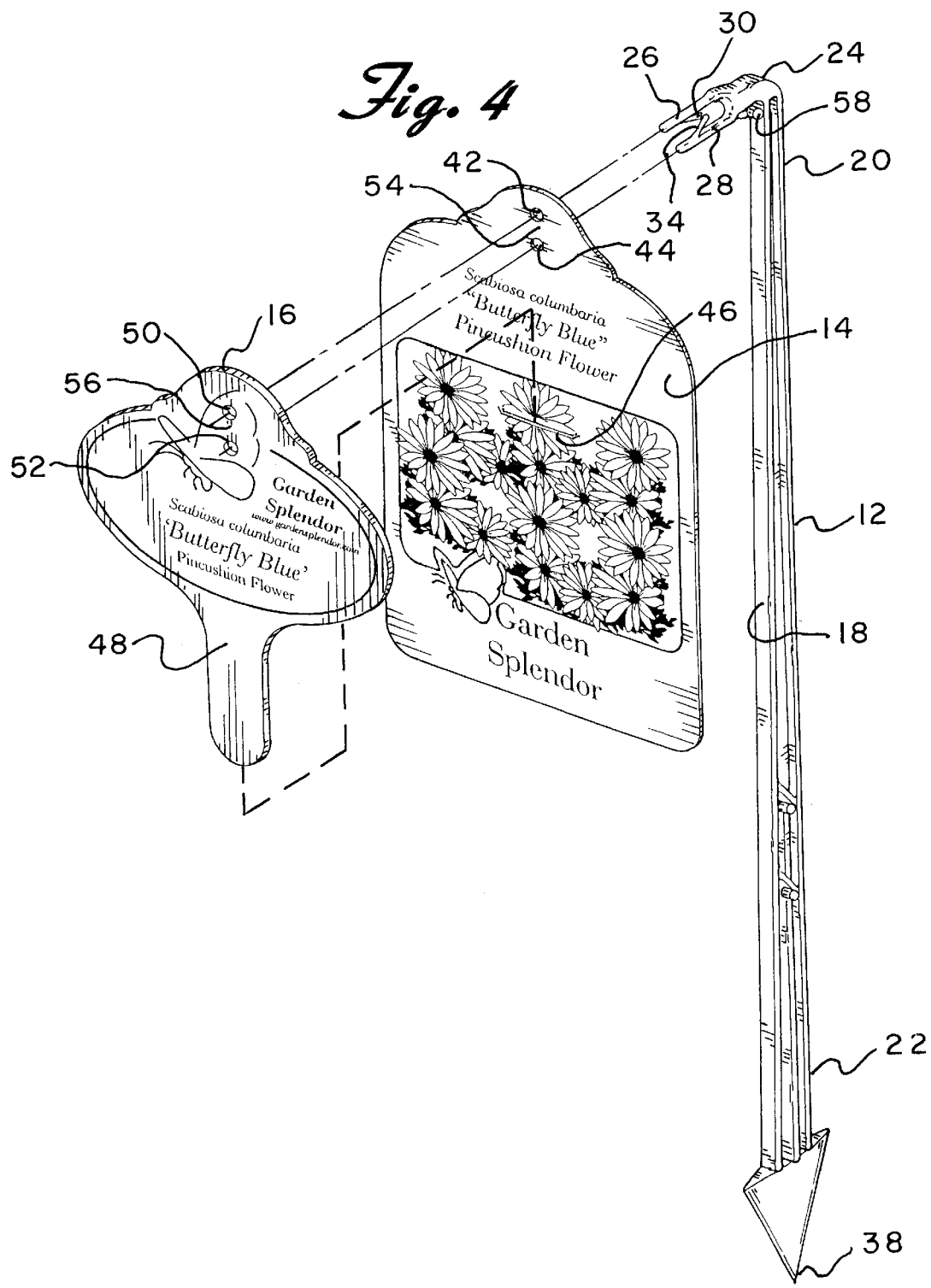

APPARATUS FOR IDENTIFYING PLANTS

BACKGROUND OF THE INVENTION

The present invention is directed toward an apparatus for identifying plants and more particularly, toward an apparatus that allows a plant to be identified while it is on display in a pot as well as when it has been removed from the pot and is transplanted into the ground.

Various types of stakes have been used with potted plants that are sold in nurseries or other types of retail businesses in order to identify the plant and to provide relevant information regarding the plant. Typically the stake is made from a flexible plastic material and is easily placed into the soil of the plant. A picture of the plant in full bloom and its scientific name may be featured on one side of the stake. Other information regarding the plant may be printed on the reverse side of the stake such as spacing, light, water, and temperature requirements, and often, the price of the plant. If the plant is to be replanted or transplanted into a garden or the ground, the stake may be removed as well and placed into the ground adjacent the plant.

An example of a stake used to identify a plant is described in U.S. Pat. No. 5,537,768 to Tesselaar et al. This patent discloses a display stake made from a plastic material with a label carrying portion that is not easily removed from the stake. The stake may be secured to the pot. This stake, however, is not meant to be removed from the pot and placed into the ground when the plant is transplanted.

Another example of a stake is shown in U.S. Pat. No. 4,027,410 to Wheeler. This patent discloses a stake made from a thin, flexible material. The stake has a portion that identifies the plant and may be inserted into a pot or into the ground when the plant is transplanted. The stake also has barbs which become entangled with the roots of the plant within the soil so that the stake cannot be easily removed from the plant.

A common problem encountered, however, by placing the stake into the ground when transplanting is that because it is so flexible and flimsy, it is often incapable of withstanding different types of weather conditions. As a result, the stake may become uprooted or otherwise displaced. Also, the stake may not be very aesthetically pleasing.

Therefore, a need exists for an aesthetically pleasing means for identifying a plant and for providing relevant information regarding the plant but that is easy to remove from a potted plant and is sturdy enough to withstand weather changes when placed into the ground.

SUMMARY OF THE INVENTION

The present invention is designed to overcome the deficiencies of the prior art discussed above. It is an object of the present invention to provide an apparatus for identifying plants when the plants are in pots or when they are transplanted into the ground.

It is another object of the present invention to provide a plant identifying apparatus that is resilient to changes in weather.

It is a further object of the present invention to provide a plant identification marker that is aesthetically pleasing.

In accordance with the illustrative embodiments demonstrating features and advantages of the present invention, there is provided an apparatus for identifying plants. The appartus includes a stake, a hang tag, and a marker. The stake includes an elongated member with a first end and a second end. The first end includes a bent portion and has a forked end with parallel top and bottom prong members. The prong members include means for removably securing the hang tag and marker thereto. The hang tag is a conventional tag made from plastic, paper coated with plastic, or the like and provides the name and other relevant information regarding a particular type of plant. Located adjacent the top of the tag are two holes formed parallel to each other. Located below the holes is a slit. The marker is made from a weather resistant material. The marker may be generally oval-shaped with an elongated member extending downwardly from the bottom thereof. Located adjacent the top of the marker are two parallel holes which can be aligned with the holes formed in the hang tag. In order to use the apparatus of the present invention, the elongated member of the marker is inserted into the slit formed in the hang tag so that the holes of the marker and hang tag are aligned. The prongs and arms of the stake are then inserted through the holes of the hang tag. Similarly, the prongs and arms of the stake are inserted through the holes of the marker. The arms prevent the hang tag and marker from being removed from the stake unless so desired by the user. The stake may now be placed in a potted plant. If the user so desires, the hang tag may be removed from the stake by passing the securing means and prongs back through the holes of the hang tag and marker. The marker may be removed from the hang tag and be replaced onto the stake as described above or may be placed directly into the ground or pot.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of the apparatus of the present invention;

FIG. 2 illustrates the prong members of the stake being inserted through the holes of the hang tag and marker of the present invention;

FIG. 3 is a cross-sectional view taken through line 3—3 of FIG. 1; and

FIG. 4 is an exploded view of the apparatus of the present invention.

DETAILED DESCRIPTION OF THE PREFERRED EMBODIMENT

Referring now to the drawings in detail wherein like reference numerals have been used throughout the various figures to designate like elements, there is shown in FIG. 1 an apparatus for identifying plants constructed in accordance with the principles of the present invention and designated generally as 10.

The identification apparatus of the present invention essentially includes a stake 12, a hang tag 14, and a marker 16. The stake 12 includes an elongated member 18 with a first end 20 and a second end 22. The first end 20 includes a bent portion 24 that is bent at an angle of approximately ninety degrees. (See FIG. 4.) The first end 20 is forked with a top prong member 26 and a bottom prong member 28. The prong members 26 and 28 are parallel to each other. The top prong member 26 of the forked end extends outwardly slightly more than or is relatively longer than the bottom prong member 28 of the forked end. (See FIG. 2.)

The prong members 26 and 28 include means for removably securing the hang tag 14 and marker 16 thereto. The securing means includes an arm 30 extending inwardly from the top prong member 26 with a rounded end 32 and an arm 34 extending inwardly from the bottom prong member 28 with a rounded end 36. The arms 30 and 34 are spaced slightly apart from each other or are staggered so that a small gap exists between the two arms. (See FIG. 2.) The second end 22 of the stake 12 may be in a generally triangular or arrowhead shape terminating in a sharp point 38 so that the stake 12 may be easily inserted into the soil of a potted plant or the ground 40. The stake 12 may be made from plastic or similar type of material known and used in the art.

The hang tag 14 is a conventional tag made from a flexible plastic, paper coated with plastic, or the like typically used in the art and provides the name and other relevant information regarding a particular type of plant. For example, a picture of the plant in full bloom and its scientific name may be featured on one side of the tag. (See FIG. 4.) Other information regarding the plant may be printed on the reverse side of the tag such as spacing, light, water, and temperature requirements, and often, the price of the plant as well as the name of the retailer. Located adjacent the top of the tag are two holes 42 and 44 formed parallel to each other. Located below the holes is a slit 46. The purposes of the holes 42 and 44 and slit 46 will be described in greater detail below.

The marker 16 is made from a weather resistant material, such as aluminum or other metal. The marker 16 may be in form of a medallion with a generally oval shape. An elongated member 48 extends downwardly from the bottom thereof. (See FIG. 4.) Located adjacent the top of the marker 16 are two parallel holes 50 and 52 which can be aligned with the holes 52 and 44, respectively, formed in the hang tag 14. The marker 16 provides the name and possibly other relevant information regarding a particular type of plant. (See FIG. 1.)

In order to use the apparatus of the present invention, the elongated member 48 of the marker 16 is inserted into the slit 46 formed in the hang tag 14 so that the holes 50 and 52 of the marker 16 and the holes 42 and 44 of the hang tag 14 are aligned. (See FIG. 4.) The slit 46 provides means for removably mounting the marker 16 on the tag 14. The prong member 26 and arm 30 are then inserted through hole 42 of the hang tag 14 and the prong member 28 and arm 34 are inserted through hole 44 of the hang tag 14. Similarly, the prong member 26 and arm 30 are inserted through hole 50 of the marker 16 and prong member 28 and arm 34 are inserted through hole 52 of the marker 16. (See FIGS. 2 and 3.)

The arms 30 and 34 are flexible enough to pass through the holes formed in the hang tag 14 and marker 16 and yet arms 30 and 34, in their natural position, are blocked by portion 54 between the holes 42 and 44 of the hang tag 14 and portion 56 between the holes 50 and 52 of the marker 16 from passing through the holes again. (See FIG. 3.) In this manner, the hang tag 14 and marker 16 are prevented from being removed from the stake 12 unless so desired by the user, as will be described below. A rounded shoulder or stop member 58 located on the stake 12 adjacent the bent portion 24 prevents the hang tag 14 and marker 16 from sliding or being forced down the stake 12. The stake 12 may now be placed into the soil 40 of a potted plant.

If the user so desires, the hang tag 14 may be removed from the stake 12 by passing the arms 30 and 34 and prong members 26 and 28 back through the holes 42, 44, 50, and 52 of the hang tag 14 and marker 16. This may be accomplished by squeezing each of the arms 30 and 34 towards its respective prong member 26 and 28 so that the rounded ends 32 and 36 clear the portions 54 and 56 of the hang tag 14 and marker 16, respectively, and pass back through the holes 42, 44, 50, and 52, respectively. The marker 16 may be removed from the slit 46 of the hang tag 14 and the elongated member 48 of the marker 16 placed directly into the pot or into the ground if the plant is being transplanted. Alternatively, the marker 16 may be replaced onto the stake 12.

The present invention may be embodied in other specific forms without departing from the spirit or essential attributes thereof and accordingly, reference should be made to the appended claims rather than to the foregoing specification as indicating the scope of the invention.

We claim:

1. An apparatus for identifying plants comprising:
   an elongated stake;
   a tag providing information regarding a plant;
   an inflexible marker providing information regarding the plant, said marker having an elongated member extending therefrom;
   said stake having means for removably securing said tag and said marker to said stake, said removable securing means including at least one prong member;
   said tag having means for removably mounting said marker to said tag, said removable mounting means including an elongated slit formed within said tag and said elongated member being adapted to pass through said elongated slit; and
   said tag and said marker having holes formed therethrough, said holes being adapted to fit onto said at least one prong member.

2. The apparatus for identifying plants of claim 1 wherein said stake has a first end and a second end said removable securing means being located adjacent said first end and said second end being adapted to be inserted into soil.

3. The apparatus for identifying plants of claim 1 wherein said removable securing means of said stake includes a forked end with a top prong member and a bottom prong member located parallel to each other, said top prong member being relatively longer than said bottom prong member and each of said prong members having a flexible arm extending toward each with a slight gap existing between said arms.

4. The apparatus for identifying plants of claim 1 wherein said tag is made from a flexible plastic.

5. The apparatus for identifying plants of claim 1 wherein said marker is made from a weather resistant metal.

6. The apparatus for identifying plants of claim 1 wherein said marker is in a generally oval shape.

* * * * *